(12) United States Patent
Murahari et al.

(10) Patent No.: US 12,491,777 B2
(45) Date of Patent: Dec. 9, 2025

(54) ELECTRIC VEHICLE CHARGING SYSTEM AND CONNECTOR HAVING AN RFID READER AND METHOD FOR RF VALIDATION FOR CHARGING ELECTRIC VEHICLE

(71) Applicant: EATON INTELLIGENT POWER LIMITED, Dublin (IE)

(72) Inventors: Saivaraprasad Murahari, Peachtree City, GA (US); Barton Kirk Ideker, Fayetteville, GA (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 766 days.

(21) Appl. No.: 17/841,958

(22) Filed: Jun. 16, 2022

(65) Prior Publication Data

US 2023/0406124 A1 Dec. 21, 2023

(51) Int. Cl.
| | |
|---|---|
| *B60L 53/16* | (2019.01) |
| *B60L 53/30* | (2019.01) |
| *B60L 53/65* | (2019.01) |
| *B60L 53/66* | (2019.01) |
| *G06K 19/04* | (2006.01) |
| *H04W 4/80* | (2018.01) |

(52) U.S. Cl.
CPC ............ *B60L 53/16* (2019.02); *B60L 53/305* (2019.02); *B60L 53/65* (2019.02); *B60L 53/66* (2019.02); *G06K 19/041* (2013.01); *H04W 4/80* (2018.02)

(58) Field of Classification Search
CPC ........... B60L 53/16; B60L 53/66; H04W 4/80
USPC ........................................................ 320/109
See application file for complete search history.

(56) References Cited

U.S. PATENT DOCUMENTS

| | | | |
|---|---|---|---|
| 7,952,319 B2 | 5/2011 | Lowenthal et al. |
| 7,984,852 B2 | 7/2011 | Outwater |
| 8,564,403 B2 | 10/2013 | Landau-Holdsworth |
| 9,283,857 B2 | 3/2016 | Shelton et al. |
| 9,315,111 B1 | 4/2016 | McGrath et al. |
| 9,327,607 B2 | 5/2016 | Oh et al. |
| 9,760,875 B2 | 9/2017 | Viner et al. |
| 9,914,364 B2 | 3/2018 | Shumaker et al. |
| 10,150,381 B2 | 12/2018 | Lowenthal et al. |
| 10,183,586 B1 | 1/2019 | Appelbaum |
| 10,647,207 B2 | 5/2020 | Rivas et al. |
| 10,703,220 B2 | 7/2020 | Ghabra et al. |

(Continued)

FOREIGN PATENT DOCUMENTS

EP 3992018 A1 5/2022

OTHER PUBLICATIONS

European Patent Office "extended European search report" for corresponding European Patent Application No. 23176173.5, dated Feb. 16, 2024, 10 pp.

*Primary Examiner* — Suchin Parihar
(74) *Attorney, Agent, or Firm* — Eckert Seamans Cherin & Mellott, LLC

(57) ABSTRACT

A connector for use in charging an electric vehicle (EV). The connector includes a housing, an electrical receptacle coupled to the housing and structured to be inserted into and electrically couple with a charging port of the electric vehicle, and a radio frequency identification (RFID) reader disposed within or on the housing of the connector, the RFID reader structured to read RFID tags and, in response to reading an approved code from an RFID tag, to enable charging of the EV.

18 Claims, 6 Drawing Sheets

(56) References Cited

U.S. PATENT DOCUMENTS

| | | |
|---|---|---|
| 10,793,014 B2 | 10/2020 | Haddad et al. |
| 10,960,782 B2 * | 3/2021 | Goei ................ B60L 53/67 |
| 11,167,655 B2 | 11/2021 | Rivas et al. |
| 11,390,178 B1 * | 7/2022 | Wiegman ............ B60L 53/16 |
| 12,252,029 B2 * | 3/2025 | Wang .............. B60L 53/305 |
| 2013/0257373 A1 | 10/2013 | Mallon, IV et al. |
| 2014/0203077 A1 | 7/2014 | Gadh et al. |
| 2020/0101849 A1 * | 4/2020 | Ghabra ............ G06K 19/0723 |
| 2020/0134742 A1 | 4/2020 | Turner |
| 2022/0089055 A1 | 3/2022 | TenHouten et al. |
| 2023/0057474 A1 * | 2/2023 | Wiegman ............ B60L 53/66 |

* cited by examiner

ELECTRIC VEHICLE CHARGING SYSTEM AND CONNECTOR HAVING AN RFID READER AND METHOD FOR RF VALIDATION FOR CHARGING ELECTRIC VEHICLE

FIELD OF THE INVENTION

The disclosed concept relates generally to charging systems and method of charging, and in particular, to charging systems for electric vehicles (EVs). The disclosed concept further pertains to EV connectors for charging stations. The disclosed concept further relates to methods for charging EVs with a charging station, and in particular methods of radio frequency validation for charging EVs.

BACKGROUND OF THE INVENTION

With the development of electric vehicle technology, the number of EVs is growing rapidly, and electric vehicle charging stations have become popular. An EV charging station, also called an electric recharging point, charging point, or EVSE (Electric Vehicle Supply Equipment), is an element in an infrastructure that supplies electric energy for the recharging of electric energy for the recharging of EVs, plug-in hybrid electric-gasoline vehicles, or semi-static and mobile electrical units such as exhibition stands. An EV charging station is a device that safely allows electricity to flow. These charging stations and the protocols established to create them are known as EVSE, and they enhance safety by enabling two-way communication between the charging station and the electric vehicle.

The 1996 NEC and California Article 625 define EVSE as being the conductors, including the ungrounded, grounded, and equipment grounding conductors, the electric vehicle connectors, attachment plugs, and all other fittings, devices, power outlets or apparatus installed specifically for the purpose of delivering energy from premises wiring to an electric vehicle. EVSE is defined by the Society of Automotive Engineers (SAE) recommended practice J1772 and the National Fire Protection Association (NFPA) National Electric Code (NEC) Article 625. While the NEC defines several safety requirements, J1772 defines the physical conductive connection type, five pin functions (i.e., two power pins (Hot1 and Hot2 or neutral; or Line 1 and Line 2), one ground pin, one control pilot pin, and one proximity pin), the EVSE to EV handshake over the pilot pin, and how both parts (EVSE and EV) are supposed to function. Two-way communication seeks to ensure that the current passed to the EV is both below the limits of the EV can receive. There are additional safety features, such as a safety lockout, that does not allow current to flow from the EV charging station until the EV connector or EV plug is physically inserted into the EV and the EV is ready to accept energy. For example, J1772 in North America uses a very simple but effective pilot circuit and handshake in the EVSE.

Conventional EV charging stations consist of an EV charger (typically, included within a charging box) along with a connected EV cable/connector for the intended purpose of charging the EV. They can be public, similar to gas stations, or private. Typically, a conventional EV charging station requires a pedestal or wall-mounted EV charger with an RFID reader embedded in the EV charger. However, there are some charging stations that do not require such pedestal or wall-mounted EV charger. For example, an EV charger in a circuit breaker form factor may be installed in a power panel remotely located from the charging station and the circuit-breaker based EV charger is coupled to a disconnect switch box located at the charging station, the disconnect switch box including terminal blocks for the communication lines (e.g., a control pilot line, etc.). As such, a charging station coupled to a circuit-breaker based EV charger consists of an EV connector, which is coupled to a disconnect switch box connected to the breaker based EV charger via an EV charging cable. Such charging station simply lacks an EV charger base unit in which the RFID reader is required to be embedded. Thus, it is desirable to have a convenient authentication and validation mechanism that is not restricted to be embedded only in the EV charger base, and available at every charging station.

In addition, some charging stations may also be allowed to charge only authorized EVs. For example, a corporation may have a fleet of EVs which the corporation allows its employees to use for business related matters. Such corporation may also provide a corporate-owned charging station to be installed at its employees' residences for convenient charging of the fleet EVs. However, such corporate-owned charging station does not have a mechanism to verify the identification of a specific EV connected to the charging station and being charged. As such, the corporate-owned charging station may supply power to any EV connected to the charging station for as long as the connected EV is ready to accept the power, resulting in costly unauthorized charging of non-fleet EVs.

As such, it is desirable to have an authentication and validation mechanism for the identification of a specific EV before the charging station commences charging the specific EV.

There is, therefore, room for improvement in charging stations and in connectors therefor.

There is also room for improvement in methods of charging an EV with a charging station.

SUMMARY OF THE INVENTION

These needs, and others, are met by a connector for use in charging an electric vehicle (EV). The connector includes a housing, an electrical receptacle coupled to the housing and structured to be inserted into and electrically couple with a charging port of the electric vehicle, and a radio frequency identification (RFID) reader disposed within or on the housing of the connector, the RFID reader structured to read RFID tags and, in response to reading an approved code from an RFID tag, to enable charging of the EV.

Another example embodiment provides an electric vehicle charging system for charging an electric vehicle (EV), the electric vehicle charging system including: an EV charger coupled to a power source; an electrical receptacle coupled to the housing and structured to be inserted into and electrically couple with a charging port of the electric vehicle; and a charging cable coupled to the EV charger; and a connector coupled to the charging cable. The connector includes a housing; an electrical receptacle coupled to the housing and structured to be inserted into and electrically couple with a charging port of the electric vehicle; and a radio frequency identification (RFID) reader disposed within or on the housing of the connector, the RFID reader structured to read RFID tags and, in response to reading an approved code from an RFID tag, to enable the EV charger to charge the EV with power from the power source.

Another example embodiment provides a connector for use in charging an electric vehicle (EV). The connector includes: a housing, an electrical receptacle coupled to the housing and structured to be inserted into and electrically couple with a charging port of the electric vehicle, and a radio frequency identification (RFID) reader disposed within or on the housing of the connector, the RFID reader structured to read RFID information from an RFID tag and to output the RFID information.

BRIEF DESCRIPTION OF THE DRAWINGS

A full understanding of the invention can be gained from the following description of the preferred embodiments when read in conjunction with the accompanying drawings in which.

DETAILED DESCRIPTION OF THE INVENTION

Figure 1:
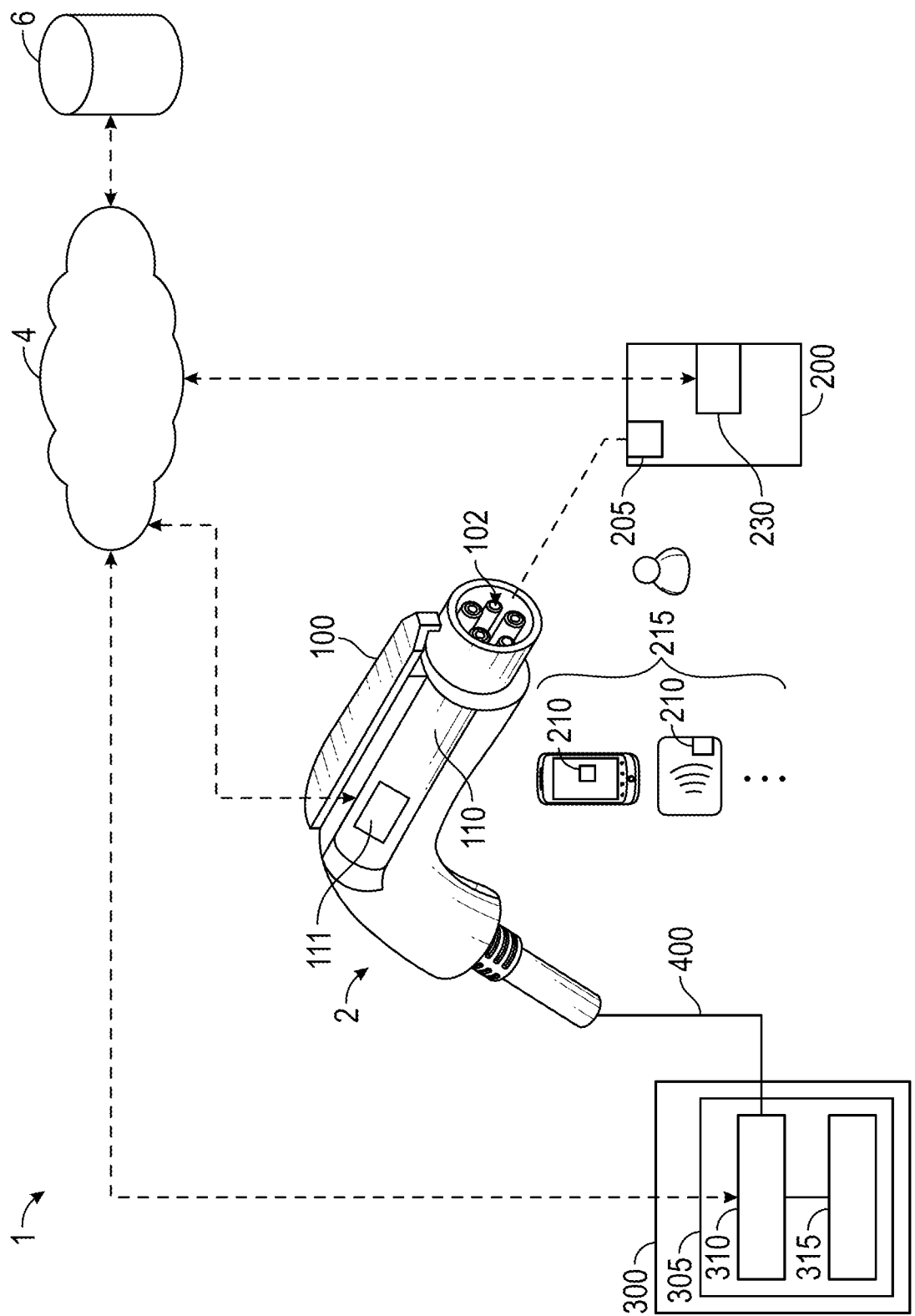
FIG. 1 illustrates a system for EV charging in accordance with a non-limiting embodiment of the disclosed concept.

Directional phrases used herein, such as, for example, left, right, front, back, top, bottom and derivatives thereof, relate to the orientation of the elements shown in the drawings and are not limiting upon the claims unless expressly recited therein.

As employed herein, the statement that two or more parts are "coupled" together shall mean that the parts are joined together either directly or joined through one or more intermediate parts.

As employed herein, the term "charging box" shall mean an apparatus having any geometry (e.g., box-shaped and non-box shaped geometries), and that is structured to produce an electric charge for the purpose of charging an EV.

Conventional EV charging stations consist of an EV charger (typically, included within a charging box) along with a connected EV cable/connector for the intended purpose of charging the EV. They can be public, similar to gas stations, or private. Typically, a conventional EV charging station requires a pedestal or wall-mounted EV charger with an RFID reader embedded in the EV charger. However, there are some charging stations that do not require such pedestal or wall-mounted EV charger. For example, an EV charger in a circuit breaker form factor may be installed in a power panel remotely located from the charging station and the circuit-breaker based EV charger is coupled to a disconnect switch box located at the charging station, the disconnect switch box including terminal blocks for the communication lines (e.g., a control pilot line, etc.). As such, a charging station coupled to a circuit-breaker based EV charger consists of an EV connector, which is coupled to a disconnect switch box connected to the breaker based EV charger via an EV charging cable. Such charging station simply lacks an EV charger base unit in which the RFID reader is required to be embedded. In some examples, conventional EV chargers may not have an RFID reader installed at all, but have a different payment approval/processing method (e.g., without limitation, a magnetic swipe card reader). Thus, it is desirable to have a convenient authentication and validation mechanism that is not restricted to be embedded only in the EV charger base or can be used with conventional EV charging stations that do not have an RFID reader installed, and available at every charging station.

In addition, some charging stations may also be allowed to charge only authorized EVs. For example, a corporation may have a fleet of EVs which the corporation allows its employees to use for business related matters. Such corporation may also provide a corporate-owned charging station to be installed at its employees' residences for convenient charging of the fleet EVs. However, such corporate-owned charging station does not have a mechanism to verify the identification of a specific EV connected to the charging station and being charged. As such, the corporate-owned charging station may supply power to any EV connected to the charging station for as long as the connected EV is ready to accept the power, resulting in costly unauthorized charging of non-fleet EVs. As such, it is desirable to have an authentication and validation mechanism for the identification of a specific EV before the charging station commences charging the specific EV.

The example embodiments of the disclosed concepts resolve these problems by providing an EV connector for a charging station including an RFID reader disposed within or on a housing of the EV connector in order to facilitate identification and authentication of users, payment mechanisms, EVs, or other communication with user devices including RFID tags. By embedding the RFID reader in the EV connector and placing the RFID reader within or on the housing of the EV connector, the example embodiments no longer restrict the RFID reader to be embedded only in the EV charger base unit. As such, the embodiments allow every charging station to be equipped with the RFID reader since every charging station includes an EV connector for connecting the EV with the power source. Further, the embodiments streamline the charging process in one simple sequence: connecting the EV connector to the EV, aligning an RFID tag with the RFID reader on the EV connector, and charging the EV upon validation of authentication data from the RFID tag. The RFID technology is discussed in detail with respect to FIG. 1.

In some example embodiments of the disclosed concepts, an RFID tag including identification information of a specific EV is affixed to the very specific EV (e.g., without limitation, on or within a charging port of the EV). For example, where a corporation allows an employee to use a fleet EV and charge the fleet EV using a corporate-owned charging station installed at the employee's residence, an RFID tag including the identification information of the specific fleet EV is affixed to the inner surface of the lid of the charging port of the specific fleet EV. As such, when the EV connector is connected to the EV, the RFID reader on the EV connector receives a predefined code associated with the identification information from a low power transmitter in the RFID tag and transmits the identification information to an authentication server for validation. The RFID reader further includes a proximity sensor for determining, based on a signal strength of the RFID tag, whether the distance between the specific fleet EV and the RFID reader is within a predetermined proximity threshold (e.g., without limitation, less than 0.3 meter (1 foot)). The proximity determination helps prevent anyone from charging a non-fleet EV positioned near the specific fleet EV. As such, a specific fleet EV is approved for charging only if its identification has been validated and its proximity to the RFID tag has been verified. Thus, the combination of using the predefined code for validation and verifying the proximity between the RFID reader and the RFID tag ensures that only the EVs approved for charging can be charged by the corporate-owned charging station. Upon the two-fold approval of the specific EV for charging, the corporate-owned charging station will be activated and provide electricity to charge the specific EV. In addition, placing the RFID tag to the specific EV further streamlines the charging process: plugging in the EV connector to the EV and charging the EV upon the approval. There is no need for the user to align the RFID tag with the RFID reader since they are automatically aligned within a read range of the RFID reader once the EV connector is connected to the charging port of the EV. Such automatic alignment leads to a truly simple and contactless RF validation of the EV for charging, increasing the convenience to the user.

FIG. 1 illustrates a system 1 for EV charging in accordance with a non-limiting embodiment of the disclosed concept. The system 1 includes an EV charging system (e.g., without limitation, a charging station) 2 with an EV 200, both communicatively coupled to a network 4, which in turn is coupled to an authentication server (e.g., without limitation, authentication database) 6. The example charging station 2 includes a charging box 300 and an EV connector 100 coupled to the charging box 300 via the EV charging cable 400. The charging box 300 includes an EV charger (e.g., without limitation, an AC charger, a DC charger, or a combination thereof) 305. The EV charger 305 is coupled to a power source (not shown) and includes a controller 315 and a communication module 310 coupled to the EV connector 100 via the EV charge cable 400. The charging box 300 may optionally include a pedestal or wall-mounted EV charger. While FIG. 1 shows a charging box 300, it is noted that a charging station may not even include a charging box 300 in some cases. For example, a charging station may utilize an EV charger in a circuit breaker form factor, which is disposed in a power control panel remotely located from the charging station. In those instances, a disconnect switch box (not shown) may be connected to the EV charger in the panel and the EV connector 100 via an EV charging cable 400 in accordance with the relevant safety standards. As such, in those examples, the charging station may include only an EV connector on site coupled to the disconnect switch box via an EV charging cable.

The EV connector 100 includes a housing 110, an electrical receptacle 102 coupled to the housing 110 and structured to be inserted into and electrically couple with a charging port 205 of the EV 200, and a radio frequency identification (RFID) reader 111 disposed within or on the housing 110 of the EV connector 100. The RFID reader 111 includes at least an antenna, a communication interface, and a reader controller (as further detailed with respect to FIG. 3). The RFID reader 111 is connected to the communication module 310 and communicatively coupled to the network 4 (e.g., without limitation, LAN, WAN, or any combination thereof), which in turn is communicatively coupled to an authentication server (e.g., without limitation, authentication database) 6. The RFID reader 111 interfaces with the communication module 310, the authentication server 6 and an RFID tag 210, which may be embedded, affixed, or disposed on or within a user device 215 using wired and/or wireless connections. The user device 215 includes, without limitation, a cellular phone, an RFID proximity chip card, a fob, a keyring, a wristband, an electric wearable, or any other appropriate device.

In order to determine whether the EV 200 can be charged, the system 1 utilizes the RF validation using RFID. In some examples, lower power RF protocols than RFID may be used for RF validation. The RFID is an RF technology using electromagnetic fields to identify, track, or authenticate the RFID tags. It is regulated by various communications standards including IEEE 802.11(a), (b) and (g), Bluetooth®, ISO/IEC 15693, ISO/IEC 14443. The RFID includes several types: low-frequency RFID (approximately between 120 and 150 kHz) having a short read range (approximately 10 cm) and low data rate; high-frequency RFID (around 13.56 MHz) having a read range (approximately 10 cm to 1 meter) and medium data rate; ultra-high-frequency RFID (approximately between 860 to 930 MHz) having a long read range (approximately 1-12 meters) and medium to high speeds; and microwave (approximately 2.45 GHz-24.125 GHz) with a long read range (approximately 1-200 meters) with high data rate.

An RFID system includes an RFID tag having an integrated circuit connected to an antenna, an interrogator (RFID reader) having an antenna, electronics and associated software, and a back-end server (e.g., without limitation, an authentication server) that collects, stores, and manages authentication data associated with the RFID tag and validation of the authentication data. The RFID tag is a label that is associated with an object (e.g., inventory, animal, etc.) to be identified, located, or authenticated. The RFID tag may be attached or embedded, or disposed within or on the object, a user device (e.g., without limitation, a cellular phone, an RFID proximity chip cards, a fob, a keyring, a wristband, or an electric wearable), or any other appropriate device. The RFID tag includes the authentication data for the object stored in a small memory therein. The RFID system operates as follows: the RFID reader broadcasts an electromagnetic interrogation signal; an RFID tag(s) within the read range transmits authentication data (e.g., identification information of the item associated with the tag) to the reader, and the reader receives the data and uses the data to, e.g., without limitation, identify, track, or authenticate the object. The user device may include a physical object (e.g., without limitation, a transaction card) or a digital representation of the physical object (e.g., without limitation, digital code or a virtual image of the physical object).

The RFID system uses a network for the communications between the devices, the network including local area networks (e.g., without limitation, wireless, wired, or power line communication networks) and/or wide area networks (e.g., without limitation, Internet). For example, the RFID system interfaces with a user device (e.g., a cellular phone, wearables, a fob, etc.) including the RFID tags physically or contactlessly. The RFID readers may include or be coupled to a controller and a communication module, which in turn are communicatively coupled to an authentication server (e.g., a database) or one or more remote systems or devices via the network. The authentication server includes stored authentication data associated with a user or the object with which the tag is associated. The validation process determines whether the authentication data received from the RFID tags are valid by comparing the authentication data with the stored authentication data for the user or the object. For the examples involving an RFID tag associated with a transaction card, the authentication data may include a cardholder's name, an account number, an expiration date, an issuer, a secret code, a personal identification number or a combination thereof. The authentication server in such instances may be operated by an authentication agency (e.g., without limitation, VISA®). If the authentication information from the RFID tag is valid, the server transmits a validation signal to the RFID reader. The RFID reader communicates the validation signal to the controller, which in turn approves the requested service (e.g., without limitation, payment in a transaction). Since the RFID requires a small antenna and is relatively low cost, the RFID has become an efficient and reliable identification, authentication, or validation technology adopted in various environments including retails, health, securities, and manufacturing areas.

Referring back to FIG. 1, the RFID reader 111 is advantageously disposed within or on the housing 110 of the EV connector 100 for convenient validation of the RFID tag 210 for charging the EV 200. The RFID reader 111 is structured to read RFID tags 210 and, in response to reading an approved code from an RFID tag 210, to enable charging of the EV 200. The RFID reader 111 is further structured to transmit the approved code to the authentication server 6 via the network 4 communicatively coupled to the authentication server 6 and the communication interface, the authentication server 6 including stored approved code associated with the RFID tag 210; receive a validation notice from the authentication server 6, the validation notice indicating that the approved code has matched the stored approved code; and communicate with the EV charger 305 coupled to the EV connector 100 via the charging cable 400 at least about the validation notice to enable the EV charger 305 to charge the EV 200. The controller 315 of the EV charger 305 is structured to at least activate the EV charger 305 based at least in part on the validation notice, and the EV charger 305 is structured to supply power from the power source to the EV 200 for charging via the EV connector 100 upon activation. In FIG. 1, the RFID tag 210 is disposed within or on a user device 215, and the approved code includes information of one or more transaction cards, the information including at least one of a name of a user, an account number, an expiration date, an issuer, a secret code, or a personal identification number. The transaction cards include, for example and without limitation, a credit card, a charge card, a debit card, a transportation pass, a Chargepoint® card, etc. Alternatively or additionally, the RFID tag 210 may be disposed within or on the charging port 205 of the EV 200 (as described in detail with reference to FIGS. 4-5), and the approved code may include EV identification data including at least one of a vehicle identification number of the EV, a year of the EV, or a make of the EV. In some examples, the approved code may also include, e.g., without limitation, the identity of the charging station 2, the owner or operator information of the charging station 2, a list of EVs approved to be charged by the charging station 2, or any other relevant information for charging the EV 200.

In some example embodiments, the RFID reader 111 is structured to read RFID information from an RFID tag 210 and to output the RFID information. The RFID reader 111 is further structured to output the RFID information to an authentication server 6 via a network 4 communicatively coupled to the authentication server 6 and the RFID reader 111, the authentication server 6 including stored RFID information associated with the RFID tag 210; receive a validation notice from the authentication server 6, the validation notice indicating that the RFID information has matched the stored RFID information; and transmit an approval for charging to an EV charger 305 coupled to a power source (not shown) and the EV connector 100 via a charging cable 400 based at least in part on the validation notice. The controller 315 of the EV charger 305 is structured to activate the EV charger 305 based on the approval and the EV charger 305 is structured to supply power from the power source to the EV 200 for charging via the EV connector 100 upon activation. The RFID information may include at least one of EV identification data, transaction card information including a name of a user, an account number, an expiration date, an issuer, a secret code, or personal identification number. The RFID information may also include the identity of the charging station 2, the owner or operator information of the charging station 2, a list of EVs approved to be charged by the charging station 2, or any other relevant information for charging the EV 200. Optionally, in addition to the RF validation, the approval may also include a proximity verification that the validated EV is within a predetermined proximity threshold or any other appropriate approval steps (e.g., without limitation, user biometric validation, billing or payment history verification, or related other accounts/users information).

The EV connector 100 may also include an indication assembly (not shown) for providing a visual indication of the charging status (e.g., without limitation, charging state, error state, or power ready state) of the EV 200 as described in U.S. Pat. No. 10,150,381, the contents of which are incorporated by reference herein.

The EV 200 includes the charging port 205 for receiving the EV connector 100 and a charging system 230 for, at least, implementing the EV charging via the EV connector 100 upon validation of the approved code or RFID information, communicating with the EV charger 305 or the authentication server 6 directly. The EV charging system 230 includes a rechargeable battery (not shown). The RFID tag 210 may be embedded, attached to, or disposed within or on a user device 215 in various form factors or other appropriate device (e.g., without limitation, the EV 200 itself as discussed in detail with reference to FIGS. 4-5). For validation, the user aligns the RFID tag 210 with the RFID reader 111 within the read range of the RFID reader 111. This is beneficial to the user since the user can simply drive into a charging station 2 and be able to charge their EVs 200 by simply aligning and authenticating their RFID tags 210 with the RFID readers 111 on the EV connector 100, regardless of the form factor or location of the EV chargers.

In FIG. 1, the charging box 300 includes the communication module 310 coupled to a controller 315 structured to, at least, activate the EV charger 305. The communication module 310 may directly communicate with the authentication server 6, e.g., without limitation, to transmit charge or metering information of the EV 200. The communication module 310 may also receive a communication from the RFID reader 111 that the approve code or RFID information from the RFID tag 210 has been validated and/or other approval factor(s) has been authenticated. Upon receipt of such communication, the controller 315 coupled to the communication module 310 may activate the EV charger 305, which in turn supplies electricity to the EV 200 for charging. In the examples in which the charging station 2 does not include a charging box 300 and/or is connected to, e.g., a circuit-breaker based EV charger, the controller 310 within the circuit-breaker based EV charger may perform the aforementioned functions.

For charging the EV 200, the user mechanically couples and electrically connects the electrical receptacle 102 of the EV connector 100 to the connection lines (not shown) in the charging port 205 of the EV 200. The user then aligns the RFID tag 210 with the RFID reader 111 within the read range of the RFID reader 111 for validation of the RFID tag 210. For example, if a user wishes to use a transaction card (e.g., without limitation, a charge card, a credit card, a debit card, a transportation card, or a Chargepoint® card) to charge the EV 200 at the charging station 2, the user may align the user device 215 (e.g., without limitation, a cellular phone) including the RFID tag 210 to the RFID reader 111 of the EV connector 100. In another example, the user may also use an RFID proximity chip card including the necessary user and payment information and align the RFID chip to the RFID reader 111. Upon the alignment, the RFID tag 210 transmits to the RFID reader 111 the approved code or RFID information including, e.g., the user's name on the card, the card's account number, expiration date, security code and so forth. The RFID reader 111 receives the approved code or RFID information from the RFID tag 210 and transmits the approved code or RFID information to the authentication server 6 via the network (e.g., LAN, WAN, or combination of both) 4. The authentication server 6, which may be operated by an authentication agency (e.g., without limitation, VISA®), collects the approved code or RFID information and compares them with the stored approved code or RFID information associated with the transaction card. If the approved code or RFID information matches the stored approved code or RFID information, the authentication server 6 transmits a validation notice to the RFID reader 111. The RFID reader 111 in turn communicates with the controller 315 that the approved code or RFID information in the RFID tag 210 has been validated. The controller 315 then activates the EV charger 305, which in turn supplies electricity to the EV 200 via the EV connector 100. The charging or metering information (e.g., the amount of electricity charged) may be then transmitted to the authentication server 6 for storage and billing.

By providing the RFID reader 111 on the EV connector 100, the charging station 2 in accordance with the disclosed concepts allows the user to seamlessly charge the EV 200 in one simple sequence of: plugging in the EV connector 100, aligning the RFID tag 210 within the read range of the reader 111 for validation, and charging the EV 200 upon validation. Since the EV connector 100 is included in any EV charging stations, the user will be allowed to charge the EV 200 at any commercial, residential or public charge station at any time so long as the RFID tag is approved for charging.

Figure 2:
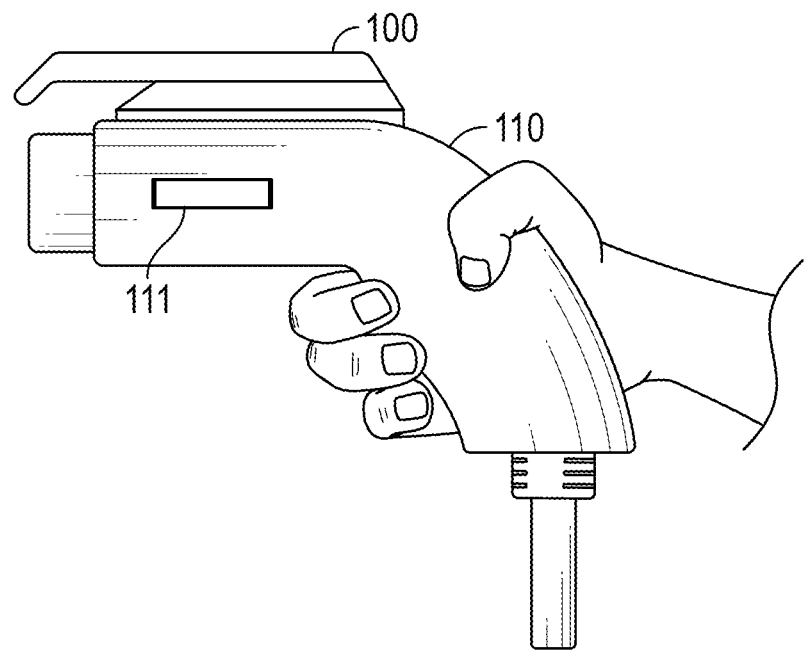
FIG. 2 illustrates a side view of the EV connector of FIG. 1.

FIG. 2 illustrates a side view of the EV connector 100 of FIG. 1. The EV connector 100 includes an RFID reader 111 built into the EV connector 100. In FIG. 2, the RFID reader 111 is disposed on a side of the housing 110 of the EV connector 100. However, this is for illustrative purposes only and the RFID reader 111 may be disposed at any other appropriate location within or on the EV connector 100.

Figure 3:
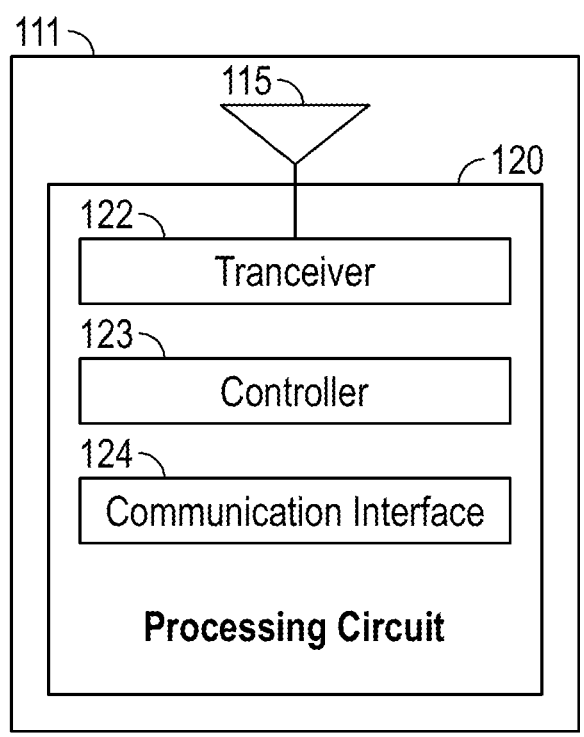
FIG. 3 illustrates a block diagram of the RFID reader of FIG. 1 in accordance with one non-limiting example of the disclosed concept.

FIG. 3 illustrates a block diagram of the RFID reader 111 of FIG. 1 in accordance with one non-limiting example of the disclosed concept. The RFID reader 111 includes at least an antenna 115 and a processing circuit 120 which includes a transceiver 122, a reader controller 123 and a communication interface 124. The antenna 115 is coupled to the transceiver 122 and used to transmit and receive RF signals associated with an RFID tag 210. The antenna 115 may be disposed external to the RFID reader 111. While the RFID reader 111 includes a transceiver 122 in FIG. 3, the RFID reader 111 may include a transmitter and a receiver separate from each other. The reader controller 123 is structured to control and/or implement the RFID reader functions. The reader controller 123 may include a processor and a memory. The processor may be, for example and without limitation, a microprocessor, a microcontroller, or some other suitable processing device or circuitry, that interfaces with the memory. The memory can be any of one or more of a variety of types of internal and/or external storage media such as, without limitation, RAM, ROM, EPROM(s), EEPROM(s), FLASH, and the like that provide a storage register, i.e., a machine readable medium, for data storage such as in the fashion of an internal storage area of a computer, and can be volatile memory or nonvolatile memory. The communication interface 124 may be used to communicate with the communication module 310 (in wired or wireless connection) of the EV charger 305 or the authentication server 6 via the network 4 wirelessly. The authentication server 6 collects, manages and/or validates the approved code or RFID information received from the RFID tag 210.

Figure 4:
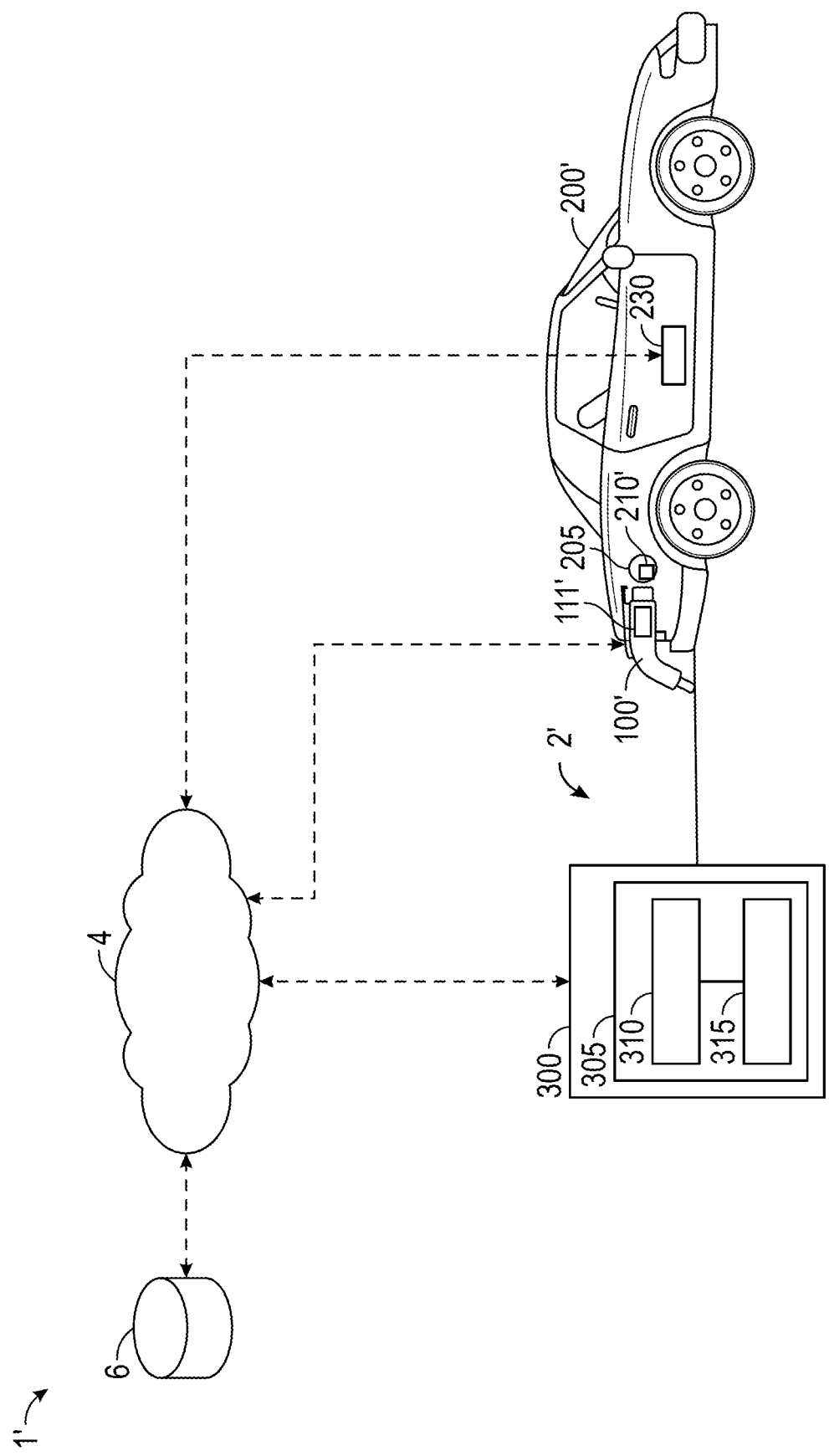
FIG. 4 illustrates another system for EV charging in accordance with a non-limiting embodiment of the disclosed concept.

FIG. 4 illustrates another system 1' for EV charging in accordance with a non-limiting embodiment of the disclosed concept. The system 1' includes similar features as the system 1 of FIG. 1 except that the RFID tag 210' is disposed directly on the EV 200' (e.g., without limitation, on an inner surface of a lid of the charging port 205 of the EV 200'); the RFID tag 210' includes a predefined approved code including EV identification data of the EV 200'; the RFID reader 111' also includes a proximity sensor (not shown) for determining, based on a signal strength of the RFID tag 210', whether the specific EV 200' with the validated identification information is within a predetermined proximity threshold; and the authentication server 6 includes or is coupled to a central management server managed by an entity that owns or operates the charging station 2'. The overlapping description of the similar features as described in FIG. 1 is omitted for brevity.

The EV identification data include at least one of a vehicle identification number of the EV 200', a year of the EV 200', or a make of the EV 200'. The server 6 or the central management server includes stored approved code including the EV identification data of the specific EV 200'. If the approved code received from the RFID tag 210' matches the stored approved code in the server 6, the identification of the EV 200' has been validated. In some examples, the stored approved code includes a list of authorized EVs to be charged by the charging station 2', the identity of the charging station 2', the owner or operator information of the charging station 2', or any other relevant information for charging the EV 200'. The proximity sensor may be any type of sensor (e.g., without limitation, a current transformer) suitable for detecting signals from the RFID tag 210'. The proximity sensor is structured to determine a distance between the RFID reader 111' and the RFID tag 210' based on signal strength of the RFID tag 210'. The RFID reader 111' is further structured to determine whether the distance between the RFID reader 111' and the RFID tag 210' is within a predetermined proximity threshold, and in response to a determination that the distance between the RFID reader 111' and the RFID tag 210' is within the predetermined proximity threshold, communicate to the EV charger 305 the determination in addition to the validation notice. The controller 315 of the EV charger 305 is structured to activate the EV charger 305 based at least in part on the validation notice and the determination that the distance between the RFID reader 111' and the RFID tag 210' is within the predetermined proximity threshold. The predetermined proximity threshold is, e.g., without limitation, up to 0.3 meters (one foot).

The system 1' is particularly advantageous in circumstances in which only authorized EVs are to be charged by a privately owned (e.g., corporate-owned) charging station 2'. For example, a corporation may have a fleet of EVs which it allows its employees to use for business related matters. Such corporation may also provide a corporate-owned EVSE to be installed at its employees' residences for convenient charging of the fleet EVs. Such residential charging station is typically utilized for overnight charging, which requires much electricity. Without an effective approval procedure for charging an EV, the corporate-owned EVSE may be used to charge unauthorized, non-fleet EVs, which can be costly to the corporation. By providing the RFID tag 210' including EV identification data of the specific EV 200' directly on the specific EV 200' (e.g., without limitation, within or on the charging port 205 of the EV 200', or on inner surface of a lid of the charging port 205), the validation of the specific EV 200' is made automatically upon plugging in the EV connector 100 into the charging port 205 of the EV 200'. That is, the RFID reader 111' receives and transmits the EV identification data of the EV 200' automatically to the authentication server 6, which in turn compares the EV identification data received from the RFID tag 210' to the stored EV identification data in the server 6. Upon validation of the EV identification data, the server 6 transmits a validation notice to the RFID reader 111'. However, the validation does not automatically trigger the charging. By providing the proximity sensor in the RFID reader 111', the system 1' adds one more security measure. For example, the proximity determination prevents charging of a non-authorized EV parked near the validated specific EV 200'. Thus, the approval procedure is two-fold: it does not stop at the validation of the identity of the specific EV 200', rather it ensures that only the approved specific EV 200' is in fact charged by the corporate-owned charging station 2'. Further, the placement of the RFID tag 210' on the EV 200' itself (e.g., without limitation, on the lid of the charging port 205) and the placement of the proximity sensor in the RFID reader 111' disposed within or on the housing 110 of the EV connector 100' simplify the charging process even further than the system 1 of FIG. 1 in a single step performed by the user: plugging in the EV connector 100' to the EV 200'. As such, the user needs to only plug in the EV connector 100' to the EV 200' and the rest of the charging process (e.g., without limitation, RFID alignment, RF validation, proximity verification, and charging) is automatic, affording the user even more convenience.

Figure 5:
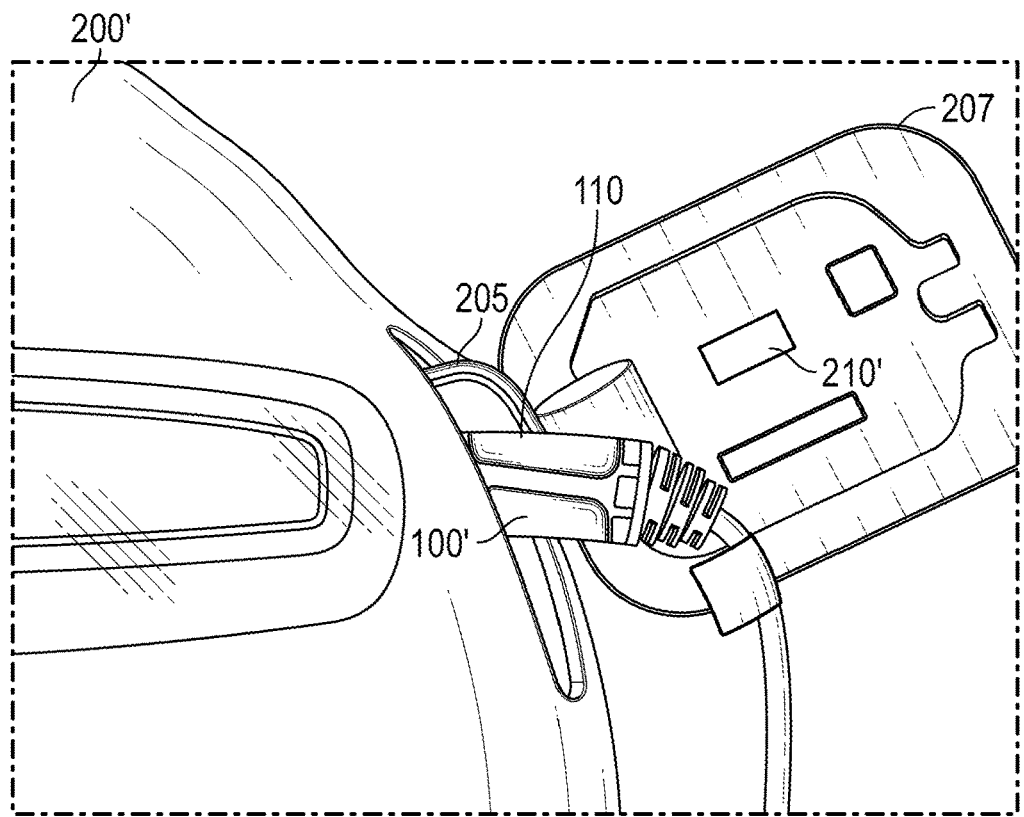
FIG. 5 illustrates a partial view of an EV of FIG. 4 with an EV connector connected thereto.

FIG. 5 illustrates a partial view of an EV 200' of FIG. 4 with an EV connector 100' connected thereto. An RFID tag 210' is disposed (e.g., without limitation, mounted, affixed, etc.) on the inner surface of a lid 207 of the charging port 205 of the EV 200'. In FIG. 5, the EV connector 100' includes an RFID reader 111' on the side (not shown) of the housing 110 of the EV connector 100', however, the RFID reader 111' may be disposed on any appropriate location within or on the housing 110. FIG. 5 shows an automatic alignment of the RFID tag 210' and the RFID reader 111', providing the user a seamless EV charging by merely plugging in the EV connector 100' to the EV 200'.

Figure 6:
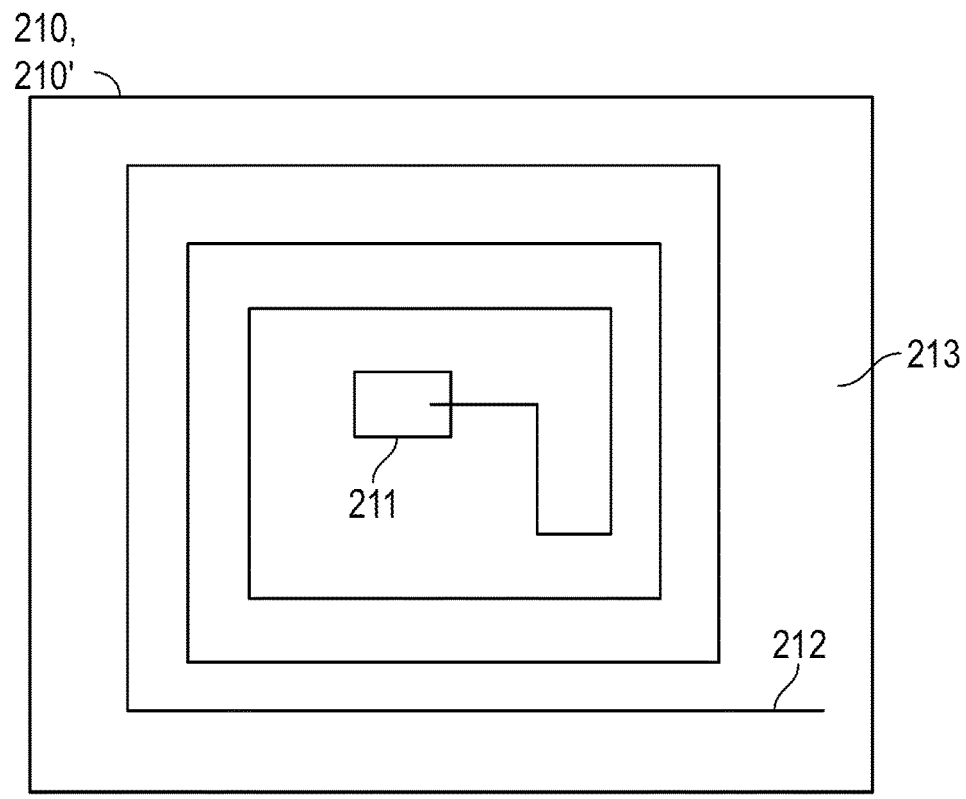
FIG. 6 illustrate an example RFID tag in accordance with one non-limiting example embodiment in accordance with the disclosed concept.

FIG. 6 illustrates an example RFID tag 210, 210' in accordance with one non-limiting example embodiment in accordance with the disclosed concept. It is noted that an RFID tag 210 may have different design, structure or component depending on the device within or on which the RFID tag 210, 210' is disposed. An RFID tag 210, 210' includes an integrated circuit 211, an antenna 212, and a substrate 213. The integrated circuit 211 is configured to store and process an approved code or RFID information including, without limitation, relevant authentication or EV identification data, and modulate and demodulate RF signals. The antenna 212 may be coupled to a low power receiver and transmitter (not shown) arranged in the integrated circuit 211. The antenna 212 in combination with the low power receiver and transmitter receives an interrogation RF signal from the RFID reader 111 and transmits RF signals including the approved code to the RFID reader 111. The substrate 213 holds the components of the tag 210' together. That is, the antenna 212 is deposited or printed on the substrate 212 and the integrated circuit 211 is attached to the antenna 212. The substrate 213 can be made from flexible material such as thin plastic or rigid material depending on the circumstances or needs.

Figure 7:
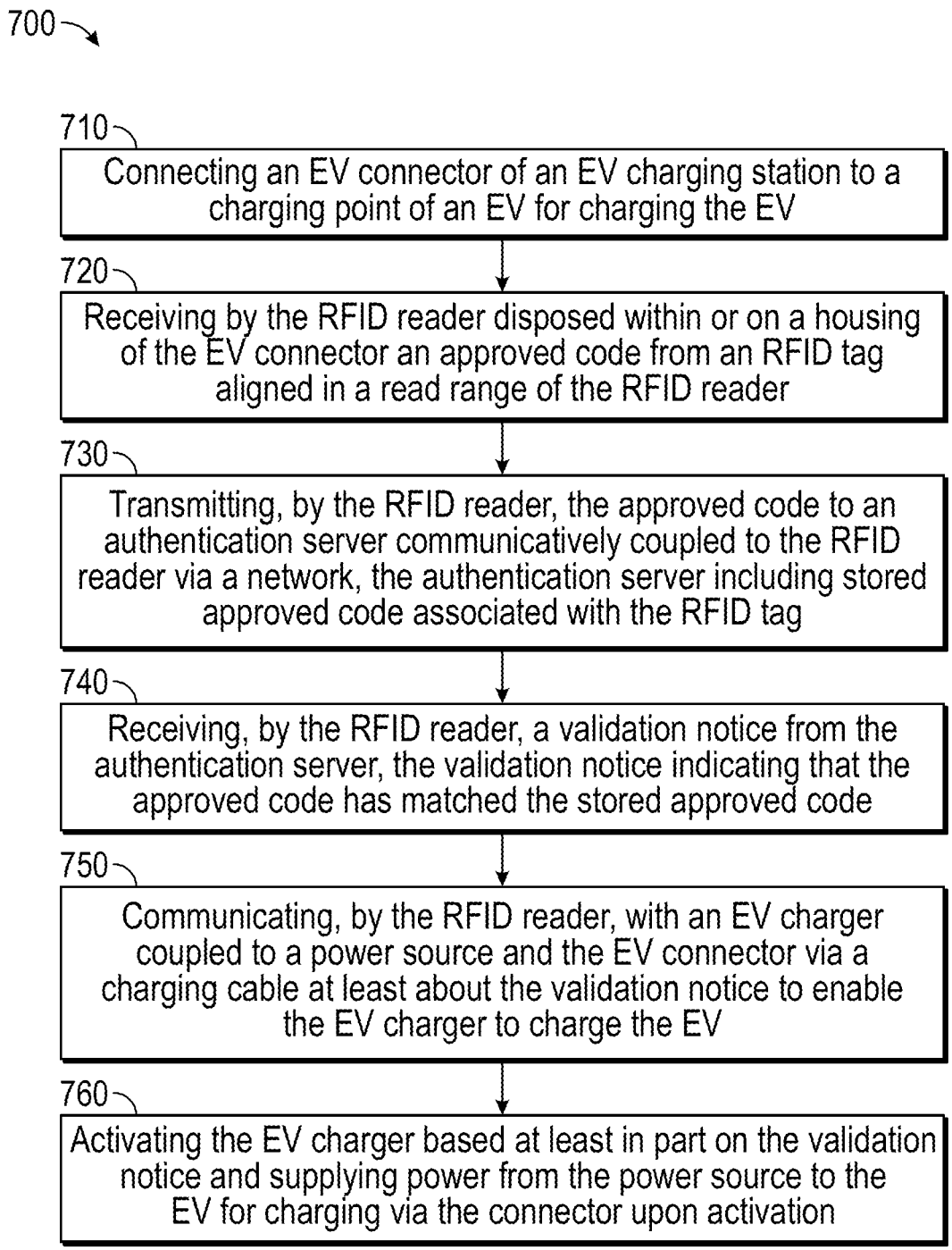
FIG. 7 illustrates a system for EV charging in accordance with a non-limiting embodiment of the disclosed concept.

FIG. 7 is a flow chart for a method 700 of charging an EV according to one, non-limiting example embodiment of the disclosed concept. The method 700 may be performed by the charging station 2 of FIG. 1 or the components thereof.

At 710, the user connects an EV connector of an EV charging station to a charging port of the EV for charging the EV.

At 720, an RFID reader disposed within or on a housing of the EV connector receives an approved code from an RFID tag aligned with the RFID reader within a read range of the RFID reader. The approved code includes authentication data including information of one or more transaction cards, the information including at least one of a name of a user, an account number, an expiration date, an issuer, a secret code, or a personal identification number.

At 730, the RFID reader transmits the approved code to an authentication server communicatively coupled to the RFID reader via a network, the authentication server including stored approved code associated with the RFID tag.

At 740, the RFID reader receives a validation notice from the authentication server, the validation notice indicating that approved code has matched the stored approved code.

At 750, the RFID reader communicates with an EV charger coupled to a power source and the EV connector via a charging cable at least about the validation notice to enable the EV charger to charge the EV.

At 760, the EV charger is activated based at least in part on the validation notice, and the EV charger supplies power from the power source to the EV for charging via the connector upon activation.

Figure 8:
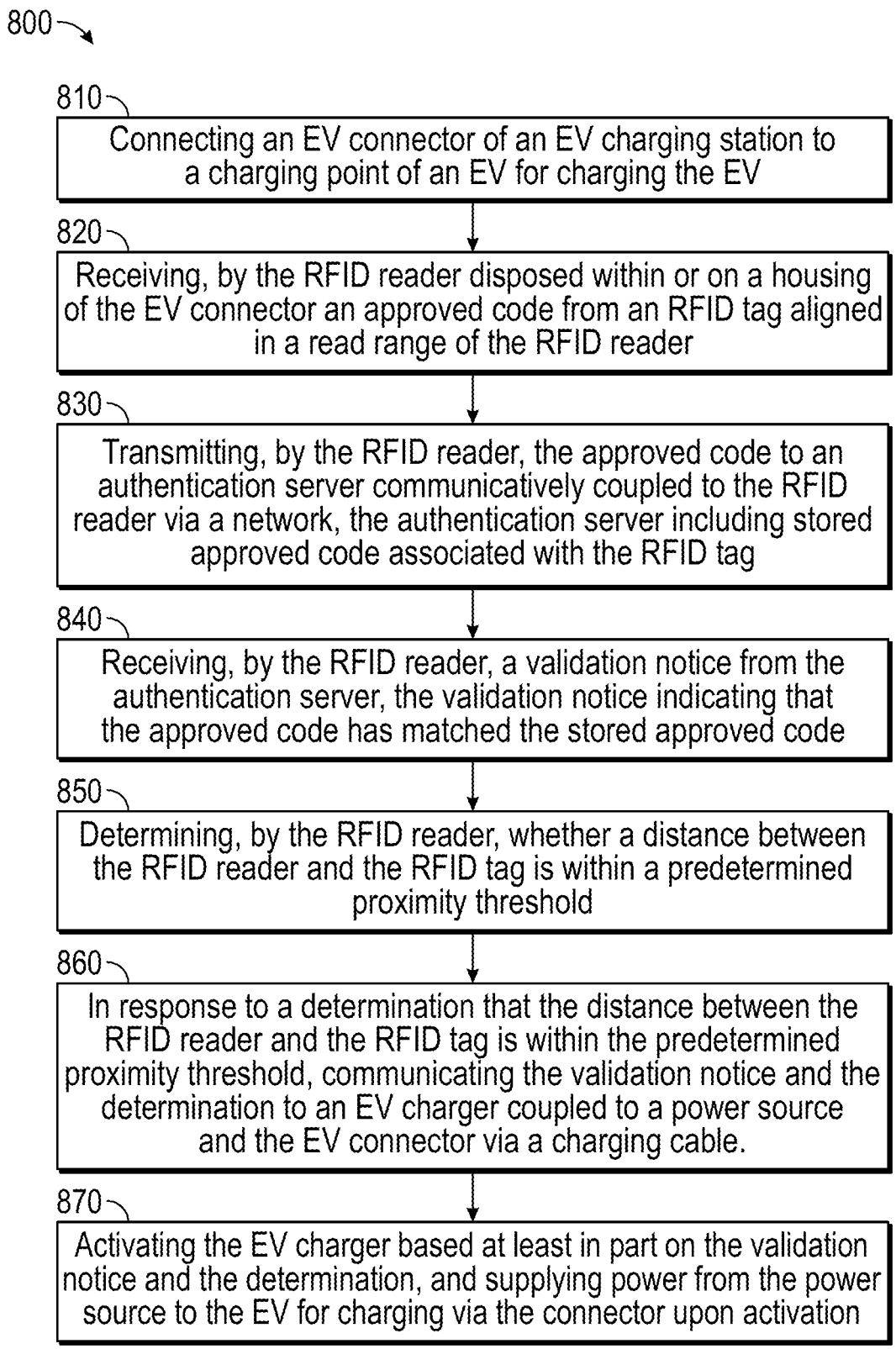
FIG. 8 is a flow chart for a method of charging an EV according to one, non-limiting example embodiment of the disclosed concept.

FIG. 8 is a flow chart for a method 800 of charging an EV according to one, non-limiting example embodiment of the disclosed concept. The method 800 may be performed by the charging station 2' of FIG. 4 or the components thereof.

At 810, the user connects an EV connector of an EV charging station to a charging port of an EV for charging the EV.

At 820, an RFID reader disposed within or on a housing of the EV connector receives an approved code of the EV from an RFID tag disposed on the EV. The approved code includes EV identification data including at least one of a vehicle identification number of the EV, a year of the EV, or a make of the EV.

At 830, the RFID reader transmits the approved code to an authentication server communicatively coupled to the RFID reader via a network, the authentication server including stored approved code.

At 840, the RFID reader receives a validation notice from the authentication server, the validation notice indicating that the approved code has matched the stored approved code.

At 850, the RFID reader determines whether a distance between the RFID reader and the RFID tag is within a predetermined proximity threshold.

At 860, in response to a determination that the distance between the RFID reader and the RFID tag is within the predetermined proximity threshold, the RFID reader communicates the validation notice and the determination to an EV charger coupled to a power source and the EV connector via a charging cable.

At 870, the EV charger is activated based at least in part on the validation notice and the determination, and supplies power from the power source to the EV to the EV via the connector for charging via the EV connector upon activation.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of disclosed concept which is to be given the full breadth of the claims appended and any and all equivalents thereof

What is claimed is:

1. A connector for use in charging an electric vehicle (EV), the connector comprising:
   a housing;
   an electrical receptacle coupled to the housing and structured to be inserted into and electrically couple with a charging port of the electric vehicle; and
   a radio frequency identification (RFID) reader disposed within or on the housing of the connector, the RFID reader structured to;
      receive RFID information via reading an RFID tag disposed on the EV, the RFID information stored at the RFID tag and comprising identification information of the EV,
      transmit the RFID information to an authentication server to authenticate the RFID information,
      receive a validation notice from the authentication server, the validation notice generated by the authentication server to indicate that the RFID information has matched stored RFID information, and
      transmit, in response to receiving the validation notice, to an EV charger coupled to the connector an approval for charging to enable charging of the EV.

2. The connector of claim 1, wherein the EV charger is coupled to a power source and comprises a controller structured to at least activate the EV charger based at least in part on the validation notice, and the EV charger is structured to supply power from the power source to the EV for charging via the connector upon activation.

3. The connector of claim 1, wherein the RFID tag is disposed in a user device comprising a cellular phone, an RFID proximity chip card, a fob, a keyring, a wristband, or an electric wearable.

4. The connector of claim 3, wherein the RFID information comprises an approved code of information of one or more transaction cards, the information including at least one of a name of a user, an account number, an expiration date, an issuer, a secret code, or a personal identification number.

5. The connector of claim 2, wherein the RFID tag is disposed within or on the charging port of the EV, and the identification information of the EV comprises EV identification data including at least one of a vehicle identification number of the EV, a year of the EV, or a make of the EV.

6. The connector of claim 5, wherein the RFID reader further comprises a proximity sensor structured to determine a distance between the RFID reader and the RFID tag based on signal strength of the RFID tag.

7. The connector of claim 6, wherein the RFID reader is further structured to:
   determine whether the distance between the RFID reader and the RFID tag is within a predetermined proximity threshold; and
   in response to a determination that the distance between the RFID reader and the RFID tag is within the predetermined proximity threshold, communicate to the EV charger the determination in addition to the validation notice.

8. The connector of claim 7, wherein the controller of the EV charger is structured to activate the EV charger based at least in part on the validation notice and the determination that the distance between the RFID reader and the RFID tag is within the predetermined proximity threshold.

9. An electric vehicle charging system for charging an electric vehicle (EV), the electric vehicle charging system comprising:
   an EV charger coupled to a power source;
   a charging cable coupled to the EV charger; and
   a connector coupled to the charging cable, the connector including:
      a housing;
      an electrical receptacle coupled to the housing and structured to be inserted into and electrically couple with a charging port of the electric vehicle; and
      a radio frequency identification (RFID) reader disposed within or on the housing of the connector, the RFID reader structured to:
         receive RFID information via reading an RFID tag disposed on the EV, the RFID information stored at the RFID tag and comprising identification information of the EV,
         transmit the RFID information to an authentication server to authenticate the RFID information,
         receive a validation notice from the authentication server, the validation notice generated by the authentication server to indicate that the RFID information has matched stored RFID information, and
         transmit, in response to receiving the validation notice, to an EV charger coupled to the connector an approval for charging to enable the EV charger to charge the EV with power from the power source.

10. The electric vehicle charging system of claim 9, wherein the EV charger is coupled to a power source and comprises a controller structured to at least activate the EV charger based at least in part on the validation notice, and the EV charger is structured to supply power from the power source to the EV for charging via the connector upon activation.

11. The electric vehicle charging system of claim 10, wherein the RFID tag is disposed in a user device comprising a cellular phone, an RFID proximity chip card, a fob, a keyring, a wristband, or an electric wearable, and the RFID information comprises an approved code of information of one or more transaction cards, the information including at least one of a name of a user, an account number, an expiration date, an issuer, a secret code, or a personal identification number.

12. The electric vehicle charging system of claim 10, wherein the RFID tag is disposed within or on the charging port of the EV, and the identification information of the EV comprises EV identification data including at least one of a vehicle identification number of the EV, a year of the EV, or a make of the EV.

13. The electric vehicle charging system of claim 12, wherein the RFID reader further comprises a proximity sensor structured to determine a distance between the RFID reader and the RFID tag based on signal strength of the RFID tag, the RFID reader is further structured to:
   determine whether the distance between the RFID reader and the RFID tag is within a predetermined proximity threshold; and
   in response to a determination that the distance between the RFID reader and the RFID tag is within the predetermined proximity threshold, communicate the determination in addition to the validation notice to the EV charger.

14. The electric vehicle charging system of claim 13, wherein the controller of the EV charger is structured to activate the EV charger based at least in part on the validation notice and the determination that the distance between the RFID reader and the RFID tag is within the predetermined proximity threshold.

15. A connector for use in charging an electric vehicle (EV), the connector comprising:
   a housing;
   an electrical receptacle coupled to the housing and structured to be inserted into and electrically couple with a charging port of the electric vehicle; and
   a radio frequency identification (RFID) reader disposed within or on the housing of the connector, the RFID reader structured to read RFID information from an RFID tag disposed on the EV, the RFID information stored at the RFID tag and comprising identification information of the EV, and to output the RFID information to an authentication server to validate the EV for charging via an EV charger coupled to the connector.

16. The connector of claim 15, wherein the RFID information comprises at least one of EV identification data or transaction card information comprising a name of a user, an account number, an expiration date, an issuer, a secret code, or a personal identification number.

17. The connector of claim 16, wherein the RFID reader is further structured to:
   output the RFID information to the authentication server via a network communicatively coupled to the authentication server and the RFID reader, the authentication server including stored RFID information associated with the RFID tag;
   receive a validation notice from the authentication server, the validation notice indicating that the RFID information has matched the stored RFID information; and
   transmit an approval for charging to an EV charger coupled to a power source and the connector via a charging cable based at least in part on the validation notice.

18. The connector of claim 16, wherein the EV charger comprises a controller structured to activate the EV charger based on the approval and the EV charger is structured to supply power from the power source to the EV for charging via the connector upon activation.

* * * * *